United States Patent
Jenkins

(10) Patent No.: US 7,247,852 B2
(45) Date of Patent: Jul. 24, 2007

(54) METHODS AND APPARATUS FOR SENSOR SYSTEMS

(75) Inventor: David G. Jenkins, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 299 days.

(21) Appl. No.: 11/039,619

(22) Filed: Jan. 19, 2005

(65) Prior Publication Data

US 2007/0096025 A1    May 3, 2007

(51) Int. Cl.
*G01J 5/02* (2006.01)
*F41G 7/00* (2006.01)

(52) U.S. Cl. .................... 250/353; 244/3.16

(58) Field of Classification Search ............... 250/353; 244/3.1, 3.15, 3.16; 398/130, 138, 169, 212
See application file for complete search history.

(56) References Cited

U.S. PATENT DOCUMENTS 3,864,567 A * 2/1975 Bez ........................... 250/232

* cited by examiner

*Primary Examiner*—David Porta
*Assistant Examiner*—David S. Baker
(74) *Attorney, Agent, or Firm*—Noblitt & Gilmore, LLC

(57) ABSTRACT

A sensor system according to various aspects of the present invention comprises a sensor viewing an area via an optical path and a strut at least partially interposed across the viewing area. The strut is configured to taper along the optical path towards the sensor. In an exemplary embodiment, the strut includes at least two sides forming an angle along their common edge exposed to the sensor along the optical path.

22 Claims, 3 Drawing Sheets

METHODS AND APPARATUS FOR SENSOR SYSTEMS

BACKGROUND OF THE INVENTION

1. Field of the Invention

The invention pertains generally to methods and apparatus relating to sensor systems.

2. Description of Related Art

For highly sensitive sensors, such as space-viewing sensors and missile defense infrared sensors, the system's ability to see targets may be limited by emissions from warm surfaces within the sensor's optical system. For example, in telescope-type systems, a secondary mirror is held relative to a primary mirror using mechanical struts that are within the sensor's collecting aperture. Traditionally, struts are painted black and are highly emissive and warm, generating a high thermal background contribution. Infrared sensors, however, operate more effectively with minimal thermal self-emission from the sensor and surrounding components reaching the focal plane array (FPA) or other detectors. The geometry around and holding the FPA is typically cooled to minimize the thermal self-emission, but the struts are not, and therefore are visible to the FPA. The strut blocks part of the sensor's collecting aperture and reflection or emission of light by struts may cause the FPA to view warm parts of the sensor and sense significant thermal background.

Newer strut designs use a highly reflective stair-step design that are used to view cold surfaces or outer space. These struts have low emissivity, so the thermal background from struts can be greatly reduced using stair steps. For sensors using advanced composite materials for their mirrors and mounts, however, struts with a stair-step pattern cannot be easily manufactured, as machining sharp corners fractures the brittle composite. Alternative designs, such as an L-shaped strut, occupy significant space.

BRIEF SUMMARY OF THE INVENTION

A sensor system according to various aspects of the present invention comprises a sensor viewing an area via an optical path and a strut at least partially interposed across the viewing area. The strut is configured to taper along the optical path towards the sensor. In an exemplary embodiment, the strut includes at least two sides forming an angle along their common edge exposed to the sensor along the optical path.

BRIEF DESCRIPTION OF THE DRAWING

A more complete understanding of the present invention may be derived by referring to the detailed description and claims when considered in connection with the figures, wherein like reference numbers refer to similar elements throughout the figures, and:

DETAILED DESCRIPTION OF EXEMPLARY EMBODIMENTS

The present specification and accompanying drawing show an exemplary embodiment by way of illustration and best mode. While these exemplary embodiments are described, other embodiments may be realized, and logical and mechanical changes may be made without departing from the spirit and scope of the invention. Thus, the detailed description is presented for purposes of illustration only and not of limitation. For example, the steps recited in any of the methods or process descriptions may be executed in any suitable order and are not limited to the order presented. Further, conventional mechanical aspects and components of the individual operating components of the systems may not be described in detail. The representations of the various components are intended to represent exemplary functional relationships, positional relationships, and/or physical couplings between the various elements. Many alternative or additional functional relationships, physical relationships, or physical connections may be present in a practical system.

The present invention is described partly in terms of functional components and various methods. Such functional components may be realized by any number of components configured to perform the specified functions and achieve the various results. For example, the present invention may employ various materials, mirrors, sensors, struts, shapes, sizes, and weights for various components, such as optical components, mechanical components, and the like, which may carry out a variety of functions. In addition, the present invention may be practiced in conjunction with any number of applications and environments, and the systems described are merely exemplary applications of the invention. Further, the present invention may employ any number of conventional techniques for manufacture, deployment, and the like.

A sensor system according to various aspects of the present invention may be used for any suitable purpose or application, such as observing remote or nearby targets, gathering information, tracking moving or stationary targets, and guiding systems toward targets. The sensor system receives relevant information relating to a particular condition, target, or other parameter, and is suitably adapted to the particular application to sense relevant data. In various applications, the sensor system 100 may sense any appropriate conditions or signals, for example movement, speed, acceleration, pressure, strain, heat, light, color, chemical composition, electromagnetic waves, magnetic fields, or any other type of physical event or presence capable of being sensed.

Figure 1:
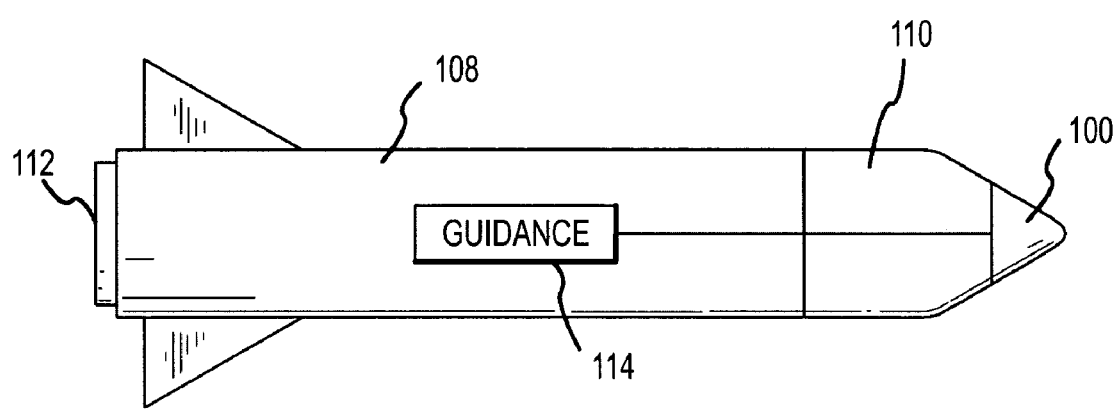
FIG. 1 is a block diagram rendering of a missile according to various aspects of the present invention.

For example, referring to FIG. 1, the sensor system 100 may be integrated into a missile 108. The missile 108 may comprise any missile system, comprising, for example, a payload 110, a propulsion system 112, and a guidance system 114. The sensor system 100 provides information to the guidance system 114 to identify and/or predict the position of a target relative to the missile 108. The guidance system 114 receives information from the sensor system 100 and processes the information to control the flight path of the missile 108 and intercept the target. Alternatively, the sensor system 100 may be used in other applications and environments for sensing information, such as astronomy instruments, cameras, and measuring instruments.

Figure 2B:
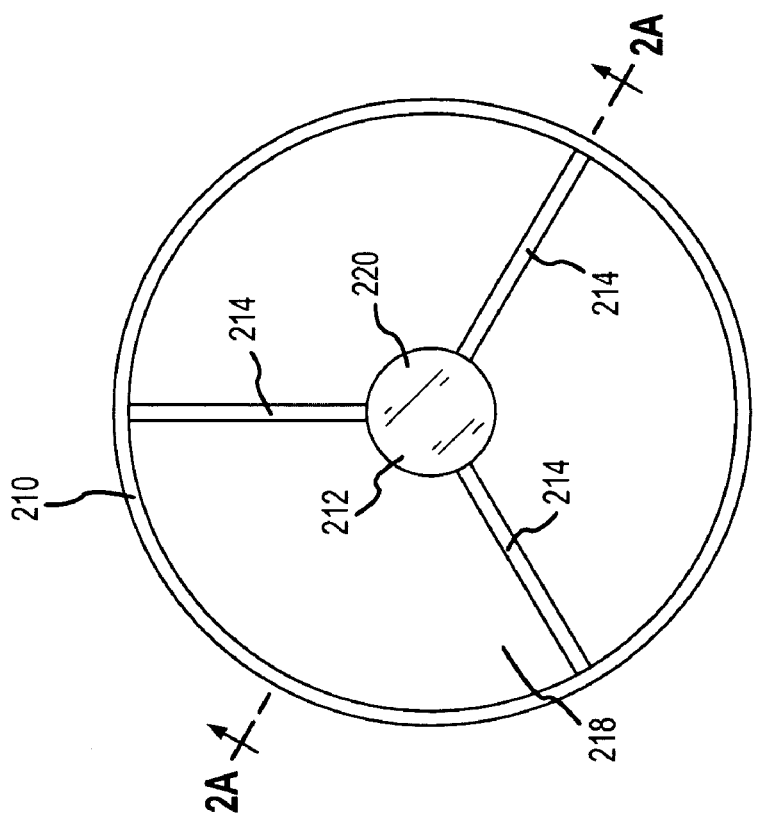
FIGS. 2A–B are side cross-section and top views, respectively, of a sensor system according to various aspects of the present invention.
Figure 2A:
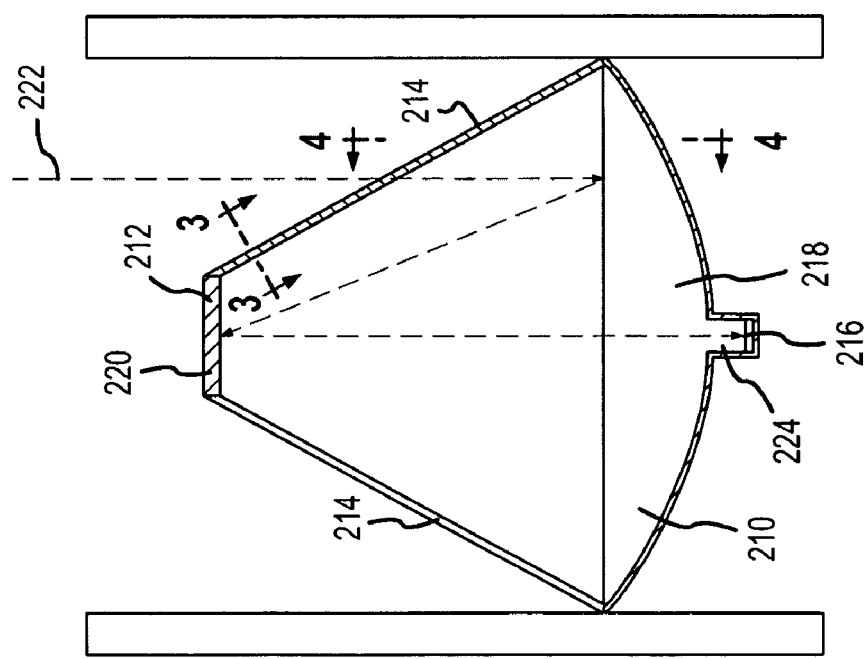

The sensor system 100 of the present embodiment comprises an infrared sensor system. Referring to FIG. 2, the sensor system 100 suitably comprises a main structure 210, a secondary structure 212, and one or more struts 214 connecting the secondary structure 212 to the main structure 210. The main structure 210 and the secondary structure 212 may comprise any appropriate components for the sensor system 100. For example, the main structure 210 of the present embodiment includes a sensor 216 and a primary mirror 218, and the secondary structure 212 includes a secondary mirror 220. The primary mirror 218 reflects incident light to the secondary mirror 220, and the secondary mirror 220 reflects light to the sensor 216.

The sensor 216, primary mirror 218, and secondary mirror 220 may comprise any suitable components for the particular application or environment. For example, in the present embodiment, the sensor 216 comprises an infrared sensor, such as a highly-sensitive infrared focal plane array (FPA) or other suitable system for translating received infrared light into information, such as in the form of electrical or optical signals. Similarly, the primary mirror 218 and the secondary mirror 220 may comprise any suitable reflectors or array of reflectors for reflecting or otherwise transmitting light to the sensor 216. In the present embodiment, the primary and secondary mirrors 218, 220 comprise high-quality composite mirrors configured to reflect and focus infrared light.

The sensor 216, primary mirror 218, and secondary mirror 220 may also be configured in any suitable configuration, and may comprise additional or fewer sensors, mirrors, and/or other components. In the present embodiment of the invention, the primary mirror 218 has a center hole 224. The sensor 216 is positioned below the center hole 224, and the secondary mirror 220 is positioned above the center hole. The primary mirror 218 focuses light on the secondary mirror 220, which in turn focuses the light on the sensor 216. Thus, light incident upon the primary mirror 218 is transmitted to the sensor 216 along an optical path 222.

The struts 214 hold the secondary mirror 220 in position. The struts 214 may comprise any appropriate supports for maintaining the position of the secondary structure 212 and may comprise any suitable substantially rigid material, such as a metal, ceramic, plastic, or the like. In the present embodiment, the struts 214 comprise a lightweight composite material for structural rigidity and low weight. The struts 214 are also substantially straight from the main structure 210 to the secondary structure 212, which simplifies manufacturing, reduces required materials, and reduces spatial requirements for the sensor system 100.

One or more of the struts 214 may extend across the collecting aperture of the sensor 216, and may thus be visible to the sensor 216. The struts 214 are suitably narrow relative to the main structure 210 to reduce the obstruction presented by the struts 214 across the sensor's 216 collecting aperture. Further, the portion of the strut 214 within the sensor's 216 collecting aperture may be configured such that at least two sides of the strut are exposed to the sensor 216. In particular, a portion of the strut 214 exposed to the sensor 216 via the optical path is tapered towards the sensor 216 along the optical path. For example, referring to FIG. 3, the cross-section of the strut 214 may be triangular, and the angle formed by two sides 310, 312 points towards the main structure 210. The edge 314 facing the sensor 216 along the optical path may be sharp to minimize the amount of surface that may reflect light to the sensor 216 other than from the sides. The areas of the strut 214 that are not visible to the sensor 216 may be configured in any suitable manner, such as flat or multi-sided.

Further, the sides of the strut 214 may be enhanced according to any suitable criteria. For example, the areas of the strut 214 visible to the sensor 216 may be treated to inhibit emissions from the strut 214 into the sensor 216. In the present embodiment, the areas of the strut 214 visible to the sensor 216 include a surface that is substantially reflective of light within the sensor's 216 frequency range, such as an enhanced gold reflective coating on a polished chemical vapor deposited substrate.

Figure 3:
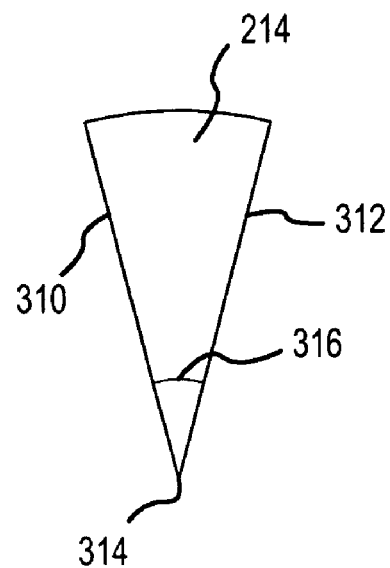
FIG. 3 is a cross-section view of a strut.
Figure 4:
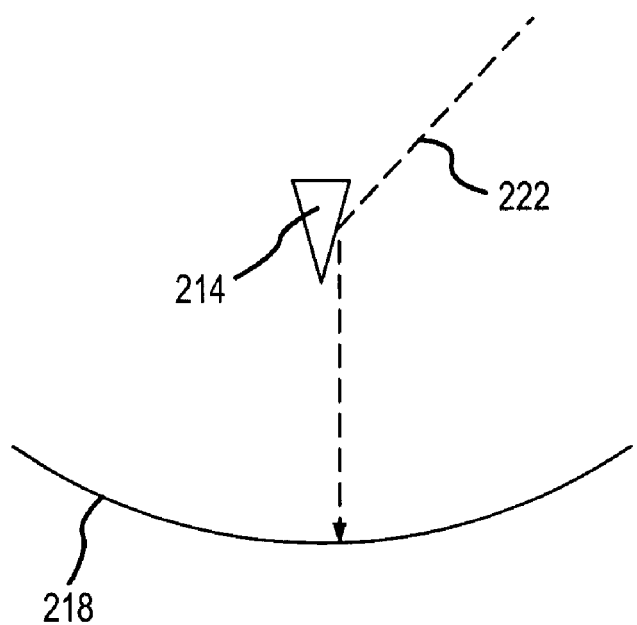
FIG. 4 is a cross section view of a primary mirror and the strut.

Referring to FIGS. 3 and 4, light visible to the sensor 216 from the strut 214 is substantially reflected from the surrounding environment, not from the sensor system 100 itself or other parts of the missile 108. The source of the light reflected from the strut 214 to the sensor 216 via the optical path may be controlled according to the draft angle 316 of the strut 214. The draft angle 316 of the strut 214 may be selected according to any suitable criteria. For example, many missile systems operate in conjunction with a solar exclusion, which requires that the sun be outside a particular angle relative to the boresight of the missile for proper operation. In the present embodiment, the draft angle 316 may be small to inhibit reflections off the strut 214 from outside the solar exclusion. Consequently, light visible to the sensor 216 that is reflected from the struts 214 is reflected substantially entirely from outside the sensor system 100 and from within the exclusion angle.

Although the description above contains many details, these should not be construed as limiting the scope of the invention but as merely providing illustrations of some of the exemplary embodiments of this invention. The scope of the present invention fully encompasses other embodiments, and is accordingly to be limited by nothing other than the appended claims, in which reference to an element in the singular is not intended to mean "one and only one" unless explicitly so stated, but rather "one or more." All structural, chemical, material, and functional equivalents to the elements of the above-described exemplary embodiments are expressly incorporated by reference and are intended, unless otherwise specified, to be encompassed by the claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element is to be construed under the provisions of 35 U.S.C. 112, sixth paragraph, unless the element is expressly recited using the phrase "means for." The terms "comprises", "comprising", or any other variation, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An optical system, comprising:
    a sensor receiving light along an optical path;
    a strut at least partially disposed in the optical path, wherein the strut includes at least two adjoining sides having a common edge, wherein the common edge points toward the sensor along the optical path.

2. An optical system according to claim 1, wherein the sensor comprises an infrared sensor.

3. An optical system according to claim 1, wherein the strut comprises a composite material.

4. An optical system according to claim 1, wherein:
    the optical system is configured to receive the light within an exclusion angle; and the two adjoining sides form an angle selected to reflect substantially only light from within the exclusion angle to the sensor.

5. An optical system according to claim 1, wherein the two adjoining sides include a substantially reflective surface.

6. An optical system according to claim 1, further comprising a primary mirror having a hole defined therethrough, wherein the sensor receives the light through the hole.

7. An optical system according to claim 6, further comprising a secondary mirror, wherein the strut connects the secondary mirror to the primary mirror.

8. An optical system according to claim 7, wherein the secondary mirror is configured to reflect the light from the primary mirror to the sensor.

9. An optical system, comprising:
a sensor receiving information along an optical path; and
a strut interposed in the path, wherein a portion of the strut exposed to the sensor via the path is tapered towards the sensor along the optical path.

10. An optical system according to claim 9, wherein the sensor comprises an infrared sensor.

11. An optical system according to claim 9, wherein the strut comprises a composite material.

12. An optical system according to claim 9, wherein:
the optical system is configured to receive the light within an exclusion angle; and
the strut includes at least two sides forming a tapered portion of the strut, wherein the at least two sides form an angle selected to reflect substantially only light from within the exclusion angle to the sensor.

13. An optical system according to claim 9, wherein the strut includes a substantially reflective surface.

14. An optical system according to claim 9, further comprising a primary mirror having a hole defined therethrough, wherein the sensor receives the light through the hole.

15. An optical system according to claim 14, further comprising a secondary mirror, wherein the strut connects the secondary mirror to the primary mirror.

16. An optical system according to claim 15, wherein the secondary mirror is configured to reflect the light from the primary mirror to the sensor.

17. An optical system, comprising:
a structure, comprising:
a primary mirror having a center hole; and
an optical sensor substantially surrounded by the primary mirror and configured to receive light via an optical path through the center hole; and
a secondary mirror configured to reflect light from the primary mirror to the sensor; and
a strut connecting the structure to the secondary mirror, wherein:
the strut is at least partially exposed to the sensor via the optical path; and
at least a portion of the strut exposed to the sensor via an optical path is tapered towards the sensor along the optical path.

18. An optical system according to claim 17, wherein the strut includes at least two adjoining sides having a common edge, wherein the common edge points toward the sensor along the optical path.

19. An optical system according to claim 17, wherein the sensor comprises an infrared sensor.

20. An optical system according to claim 17, wherein the strut comprises a composite material.

21. An optical system according to claim 17, wherein:
the optical system is configured to receive the light within an exclusion angle; and
the strut includes at least two sides forming a tapered portion of the strut, wherein the at least two sides form an angle selected to reflect substantially only light from within the exclusion angle to the sensor.

22. An optical system according to claim 17, wherein the strut includes a substantially reflective surface.

* * * * *

UNITED STATES PATENT AND TRADEMARK OFFICE
CERTIFICATE OF CORRECTION

PATENT NO. : 7,247,852 B2 Page 1 of 1
APPLICATION NO. : 11/039619
DATED : July 24, 2007
INVENTOR(S) : Jenkins It is certified that error appears in the above-identified patent and that said Letters Patent is hereby corrected as shown below:

Prior to the FIELD OF INVENTION section (paragraph 0001) on page 1 of the specification, please add the following paragraph:

This invention was made with United States Government support under Contract number N00024-03-C-6111 awarded by the Department of the Navy. The United States Government has certain rights in this invention.

Signed and Sealed this

Twenty-third Day of September, 2008

JON W. DUDAS
*Director of the United States Patent and Trademark Office*